Patented Feb. 23, 1926.

1,574,494

UNITED STATES PATENT OFFICE.

LUDOLF LINDEMANN, OF ALTONA-BAHRENFELD, GERMANY, ASSIGNOR TO T. P. HODGE, OF PARK RIDGE, ILLINOIS.

PROCESS OF PRESERVING YEAST.

No Drawing.      Application filed August 3, 1923.   Serial No. 655,524.

*To all whom it may concern:*

Be it known that I, LUDOLF LINDEMANN, a citizen of the German Republic, residing in Altona-Bahrenfeld, Germany, have invented certain new and useful Processes of Preserving Yeast; and I do hereby declare the following to be a full, clear, and exact description of the invention, of which the following is a specification.

It is well known in the prior art that fresh yeast is washed in large quantities of water in order to remove the particles of dirt contained therein and that in carrying out this washing process cold water has been employed of as low a temperature as possible. Yeast when obtained from molasses and washed in, such a manner will, after a period of 24 hours, develop a brown rim and send forth a sour smell and yeast obtained from corn often assumes a blueish-grey colour and will not keep for any length of time.

I have found that these disadvantages are due to an excess of glycogen (a reserve-substance contained in the cells of the yeast) in conjunction with particles of dirt and that if the amount of glycogen contained in the yeast is reduced or totally removed, the brown edges of the molasses-yeast and the blueish-grey colour of the corn-yeast will not be produced, and the yeast increases its lasting capacity by weeks, increasing at the same time its germinating power.

Wholly apart from the question of washing at low temperatures, it is a well known fact that glycogen in yeast will be caused to ferment at higher temperatures, that is to say at temperatures of more than 25 degrees centigrade, and this will take place to a still greater extent when air is admitted to the yeast. This is the cause of the molasses-yeast forming very rapidly the dirty brown edges and of the corn-yeast assuming the blueish-grey colour when the yeast is stored in a warm place which frequently cannot be avoided.

By the use of this invention these difficulties can be wholly avoided in manufacturing by washing the finely distributed, usually but not necessarily fresh yeast in sufficient quantities of warm water of at least 33 degrees and at the utmost of 43 degrees centigrade for a sufficient length of time until with the aid of the iodine or other conventional test it can then be proved, that the amount of glycogen contained in the yeast has considerably decreased. It is still better practice to carry out the process until glycogen disappears altogether.

According to a great number of experiments made, the addition of sugar or sugar-containing substances to the wash water in conjunction with the heat will cause the yeast to give off its glycogen more rapidly than where plain water is used. Yeast prepared in such a manner can even be sent to the tropics without changing its appearance or decreasing its germinating power.

After the removal of the glycogen, the finely distributed yeast is prepared for market in conventional manner.

I claim as my invention:

1. The herein described method of making fresh yeast lasting consisting in washing finely distributed fresh yeast in water of from thirty-three to forty-three degrees centigrade until tests show the substantial to complete removal of glycogen.

2. The herein described method of making fresh yeast lasting consisting in washing finely distributed fresh yeast in water containing sugar substances of from thirty-three to forty-three degrees centigrade until tests show the substantial to complete removal of glycogen.

LUDOLF LINDEMANN.